United States Patent
Huang (10) Patent No.: US 10,884,019 B2
(45) Date of Patent: Jan. 5, 2021

(54) ACCELERATOR SENSOR AND ACCELEROMETER

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Tingfeng Huang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 15/767,830

(22) PCT Filed: Sep. 29, 2017

(86) PCT No.: PCT/CN2017/104384
§ 371 (c)(1),
(2) Date: Apr. 12, 2018

(87) PCT Pub. No.: WO2018/171161
PCT Pub. Date: Sep. 27, 2018

(65) Prior Publication Data
US 2019/0094259 A1 Mar. 28, 2019

(30) Foreign Application Priority Data
Mar. 24, 2017 (CN) .......................... 2017 1 0183883

(51) Int. Cl.
G01P 15/093 (2006.01)
G01H 9/00 (2006.01)
G01P 15/08 (2006.01)

(52) U.S. Cl.
CPC .......... *G01P 15/093* (2013.01); *G01H 9/004* (2013.01); *G01P 15/0802* (2013.01)

(58) Field of Classification Search
CPC .............................. G01P 15/093; G01H 9/004
See application file for complete search history.

(56) References Cited

U.S. PATENT DOCUMENTS

| 4,930,042 A | 5/1990 | Wiegand et al. |
| 2006/0096378 A1 | 5/2006 | Quer et al. |

FOREIGN PATENT DOCUMENTS

| CN | 101034094 | 9/2007 |
| CN | 101858929 | 10/2010 |

(Continued)

OTHER PUBLICATIONS

The State Intellectual Property Office of People's Republic of China, "Office Action," issued in connection with Chinese Patent Application No. 201710183883.8, dated Oct. 26, 2018, 15 pages.

(Continued)

*Primary Examiner* — Herbert K Roberts
(74) *Attorney, Agent, or Firm* — Arent Fox LLP; Michael Fainberg (57) ABSTRACT

This disclosure discloses an acceleration sensor and an accelerometer, and the acceleration sensor includes a base, a cantilever, and a mass body fixed on the base through the cantilever, where the shape of the mass body is a centrally symmetric shape; and the cantilever includes four L-shaped arms, where the respective L-shaped arms include a long arm connected with the base, and a short arm connected with the mass body, and any adjacent two of the L-shaped arms are arranged symmetric to an axis.

14 Claims, 7 Drawing Sheets

(56) References Cited

FOREIGN PATENT DOCUMENTS

| | | |
|---|---|---|
| CN | 102128953 | 7/2011 |
| CN | 102147422 A | 8/2011 |
| CN | 102768290 | 11/2012 |
| CN | 202815008 | 3/2013 |
| CN | 103116036 | 5/2013 |
| CN | 103175992 | 6/2013 |
| CN | 103675347 | 3/2014 |
| CN | 203658394 | 6/2014 |
| CN | 105004884 | 10/2015 |
| CN | 105004884 A * | 10/2015 |
| CN | 105372449 | 3/2016 |
| CN | 105445494 | 3/2016 |
| CN | 106908624 | 6/2017 |

OTHER PUBLICATIONS

Office Action corresponding to Chinese Application No. 201710183883.8 dated Jan. 22, 2020.
International Searching Authority, "International Search Report and Written Opinion," issued in connection with International Patent Application No. PCT/CN2017/104384, dated Apr. 1, 2018, 11 pages.

* cited by examiner

ACCELERATOR SENSOR AND ACCELEROMETER

This application is a National Stacie of International Application No. PCT/CN2017/104384, filed Sep. 29, 2017, which claims the benefit of Chinese Patent Application No. 201710183883.8, filed with the Chinese Patent Office on Mar. 24, 2017 and entitled "An accelerator sensor and an accelerometer", both of which are hereby incorporated by reference in their entireties.

FIELD

The present disclosure relates to the field of micro-opto-mechatronics, and particularly to an accelerator sensor and an accelerometer.

BACKGROUND

Accelerometers have been widely applied in a number of fields of vehicles, robots, wearable devices, engineering vibration measurement, geologic exploration, navigation systems, aeronautics and astronautics, etc., and the accelerometers can be applicable to any products for which a tiny change arising from falling, inclination, motion, positioning, collision, or vibration needs to be sensed. As the micro-opto-mechatronic systems are advancing constantly, the research and development of the accelerometers has made such a significant progress that the volume thereof becomes smaller and smaller, and the sensitivity, stability, and interference robustness thereof becomes higher and higher, so various miniature accelerometers have become widely commercially available.

An existing accelerometer generally includes a mass body, a damper, an elastic element, a sensitive element, an adapting circuit, and other components. The accelerometer operates under such a principle that an inertial force applied to the mass body being accelerated is measured, and the acceleration is calculated as per the Newton's Second Law. Accordingly, higher interference robustness of the mass body is an important factor in improving the performance of the accelerometer.

SUMMARY

An embodiment of this disclosure provides an acceleration sensor including a base, a cantilever, and a mass body fixed on the base through the cantilever, wherein a shape of the mass body is a centrally symmetric shape; and the cantilever includes four L-shaped arms, wherein the respective L-shaped arms include a long arm connected with the base, and a short arm connected with the mass body, and any adjacent two of the L-shaped arms are arranged symmetric to an axis.

In the acceleration sensor according to an embodiment of this disclosure, the cantilever, the base, and the mass body are structured integrally.

In the acceleration sensor according to an embodiment of this disclosure, a material of the cantilever, the base, and the mass body is a material of silicon carbide.

In the acceleration sensor according to an embodiment of this disclosure, the material of silicon carbide is a monocrystalline material of 6H-SiC.

In the acceleration sensor according to an embodiment of this disclosure, a shape of the mass body is a rectangle, connection points of the short arms of the L-shaped arms with the mass body are adjacent to four corners of the rectangle.

In the acceleration sensor according to an embodiment of this disclosure, a length of the long arm of the respective L-shaped arms ranges from 1700 μm to 1900 μm, a length of the short arm thereof ranges from 450 μm to 550 μm, and a width of the long arm and the short arm ranges from 110 μm to 130 μm.

An embodiment of this disclosure provides an acceleration meter including the acceleration sensor according to any one of the embodiments above of this disclosure.

In the accelerometer according to an embodiment of this disclosure, the accelerometer further includes: a substrate arranged opposite to and spaced from the acceleration sensor, an encapsulation structure encapsulating the acceleration sensor and the substrate, and a light source, an annular component, a photoelectric multiplier, and a signal processing circuit, all of which are located outside the encapsulation structure, wherein the base includes a hollow bushing running through an area facing the mass body in the acceleration sensor, wherein there is a first uni-mode optic fiber arranged in the hollow bushing, and an Extrinsic Fabry-Perot Interferometric (EFPI) cavity is formed between an end face of the first uni-mode optic fiber facing the mass body and the surface of the mass body facing the substrate; the light source is connected with a first port of the annular component through a second uni-mode optic fiber, and configured to provide the annular component with light; a second port of the annular component is connected with the first uni-mode optic fiber through a third uni-mode optic fiber, and configured to transmit the light, provided to the annular component by the light source, to the mass body through the first uni-mode optic fiber; a third port of the annular component is connected with the photoelectric multiplier through a fourth uni-mode optic fiber, and configured to provide the photoelectric multiplier with reflected light received through the first uni-mode optic fiber; and the signal processing circuit is connected with the photoelectric multiplier, and configured to calculate the acceleration from a signal output by the photoelectric multiplier.

In the accelerometer according to an embodiment of this disclosure, a antireflection film is further arranged on a side of the mass body away from the substrate.

In the accelerometer according to an embodiment of this disclosure, a material of the antireflection film is aluminum nitride.

In the accelerometer according to an embodiment of this disclosure, the thickness of the antireflection film is $\lambda/8n_z$, $5\lambda/8n_z$, or $9\lambda/8n_z$, wherein $\lambda$ is the wavelength of the light source, and $n_z$ is a refractive index of the antireflection film.

In the accelerometer according to an embodiment of this disclosure, the light source is a light source of laser with a wavelength of 1550 nm.

In the accelerometer according to an embodiment of this disclosure, a material of the substrate is Pyrex glass.

In the accelerometer according to an embodiment of this disclosure, a material of the encapsulation structure is alumina ceramic.

In the accelerometer according to an embodiment of this disclosure, the first uni-mode optic fiber is a coating-free uni-mode optic fiber.

In the accelerometer according to an embodiment of this disclosure, the accelerometer further includes a display screen, connected with the signal processing circuit, configured to display the acceleration calculated by the signal processing circuit.

DETAILED DESCRIPTION OF THE EMBODIMENTS

In order to make the objects, technical solutions, and advantages of this disclosure more apparent, this disclosure will be described below in further details with reference to the drawings. Apparently the embodiments to be described are only a part but all of the embodiments of this disclosure. Based upon the embodiments here of this disclosure, all of other embodiments which can occur to those ordinarily skilled in the art without any inventive effort shall come into the scope of this disclosure as claimed.

The shapes and sizes of respective components in the drawings are not intended to reflect any real proportion, but merely intended to illustrate this disclosure.

Figure 1:
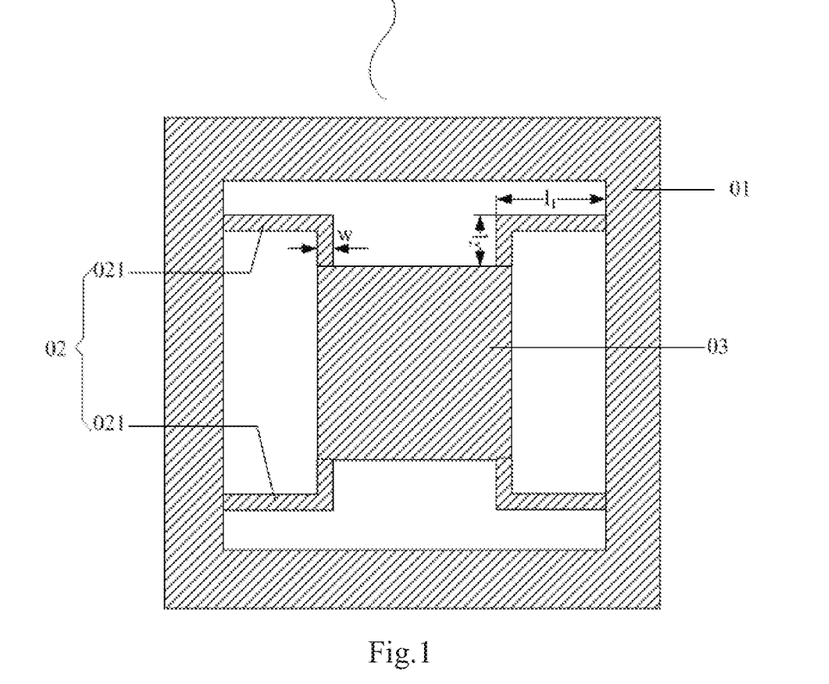
FIG. 1 is a schematic structural diagram of an acceleration sensor according to an embodiment of this disclosure.

As illustrated in FIG. 1, an acceleration sensor 1 for an accelerometer according to an embodiment of this disclosure includes a base 01, a cantilever 02, and a mass body 03 fixed on the base 01 through the cantilever 02.

The cantilever 02, the base 01, and the mass body 03 are structured integrally.

The shape of the mass body 03 is a centrally symmetric shape.

The cantilever 02 includes four L-shaped arms 021, where the respective L-shaped arms 021 include long arms connected with the base 01, and short arms connected with the mass body 03, and any adjacent two of the L-shaped arms 021 are arranged symmetric to an axis.

Optionally in the acceleration sensor according to an embodiment of this disclosure, the cantilever 02 includes the four symmetrically arranged L-shaped arms 021 holding each other transversally, so there is high transversal interference robustness, the structure is simple, and there is low fabrication difficulty.

Optionally in the acceleration sensor according to an embodiment of this disclosure, the cantilever 02, the base 01, and the mass body 03 can be structured integrally, so that they can be formed of the same piece of material without any additional process of connecting the cantilever 02 with the base 01, and with the mass body 03.

Optionally in the acceleration sensor according to an embodiment of this disclosure, the material of the cantilever 02, the base 01, and the mass body 03 can be a material of silicon carbide (SiC) because a stop band width of SiC is 2.5 times that of Si, and there is such high bonding energy of SiC that SiC has higher inertia, anti-oxidization and chemical resistance, and radiation resistance. SiC has such a factor of neutron radiation resistance that is several times that of silicon, and is thus applicable to a high-radiation exploration application. Furthermore SiC with a breakthrough field strength has good pressure robustness and a small size; and SiC with a high thermal conductivity has a high power density, and thus can operate in a high-temperature environment, where an operating temperature of the SiC material may be higher than 1000° C.

Since a monocrystalline material of 6H-SiC is one of SiC materials with the highest mechanical and refractory performance, in the acceleration sensor according to an embodiment of this disclosure, the SiC material can be the monocrystalline material of 6H-SiC.

Optionally when the shape of the mass body 03 is a square or a rectangle, there is a low fabrication cost thereof, and the acceleration can be calculated in a simple derivation formula, so in the acceleration sensor according to an embodiment of this disclosure, as illustrated in FIG. 1, the shape of the mass body 03 can be a rectangle, connection points of the short arms of the respective L-shaped arms 201 with the mass body 03 are adjacent to four corners of the rectangle.

Optionally in the acceleration sensor according to an embodiment of this disclosure, the length $l_1$ of the long arms of the respective L-shaped arms 201 ranges from 1700 μm to 1900 μm, the length $l_2$ of the short arms thereof ranges from 450 μm to 550 μm, and the width of the arms ranges from 110 μm to 130 μm.

Based upon the same inventive idea, an embodiment of this disclosure further provides an accelerometer including the acceleration sensor according to any one of the embodiments above of this disclosure. Since the accelerometer addresses the problem under a similar principle to the acceleration sensor, reference can be made to the implementation of the acceleration sensor above for an implementation of the accelerometer, and a repeated description thereof will be omitted here.

Figure 2:
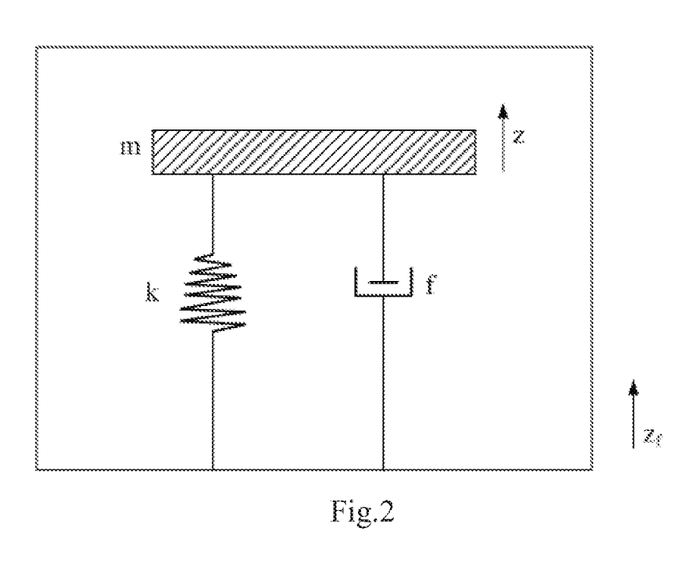
FIG. 2 is a first schematic structural diagram of an accelerometer according to an embodiment of this disclosure.

The principle under which the acceleration sensor detects the acceleration will be described below in details. Since it is difficult to measure the acceleration directly, the accelerometer system is regarded as a second-order continuous-time system in a real application, which operates in an inertial space. As per the Newton's Laws of Mechanics, the acceleration sensor can be equivalent to a mass-spring-damper (m-k-f) system as illustrated in FIG. 2. The acceleration sensor is fixed with a housing of the accelerometer, and moves relatively in the inertial space as the acceleration is varying. In the inertial space, if an absolute displacement of the housing of the accelerometer is $z_f$, and an absolute displacement of the mass body is z, then a displacement of the mass body relative to the base may be represented as: $x=z-z_f$ (1.1).

When the inertial force, the elastic force of the spring, and the damping force counteract each other and come to their equilibrium state, a second-order equation of motion for the system as per the Newton's Second. Law can be derived as:

$$m\frac{d^2z}{dt^2} + f\frac{dx}{dt} + k_m x = 0. \quad (1.2)$$

Where m is a mass of the mass body, $k_m$ is a rigidity of the spring, and f is a damping coefficient. Equation (1.1) is substituted into Equation (1.2), which can be rearranged as $$m\frac{d^2z}{dt^2} + f\frac{dx}{dt} + k_m x = -m\frac{d^2z_f}{dt^2} = -ma. \quad (1.3)$$

Where a is the overall acceleration of the system. If the system has an input variable of a(t), and an output variable of the displacement x(t) of the mass body relative to the housing, then Equation (1.3) may be Laplace-transformed under a zero initial condition into a transfer function of the system as follows $$\frac{X(s)}{A(s)} = \frac{m}{ms^2 + fs + k} = \frac{1}{s^2 + \frac{\omega_0 s}{Q} + \omega_0^2} = \frac{1}{s^2 + 2\zeta\omega_0 s + \omega_0^2}. \quad (1.4)$$

Where $\omega_0$ is an inherent resonant frequency of the mass body, and $\zeta$ is a damping ratio; and as per the engineering mechanics $$\omega_0 = \sqrt{\frac{k_m}{m}}, \zeta = \frac{f}{2\sqrt{k_m m}}, Q = \frac{1}{2\zeta} = \frac{\sqrt{k_m m}}{f}. \quad (1.5)$$

Where Q is a mechanical factor of merit. If the acceleration is input as a constant value, and x(t) approaches a constant value, then Equation (1.3) may be transformed into $$x = \frac{ma}{k_m} = \frac{a}{\omega_0^2}. \quad (1.6)$$

As can be apparent from the equation above, there is a functional function between the displacement x of the mass body relative to the base, and the acceleration a, so the acceleration can be calculated by measuring the relative displacement.

An optional implementation of the accelerometer according to the embodiment of this disclosure will be described below in connection with a particular embodiment thereof, but the embodiment of this disclosure will not be limited thereto.

Figure 3:
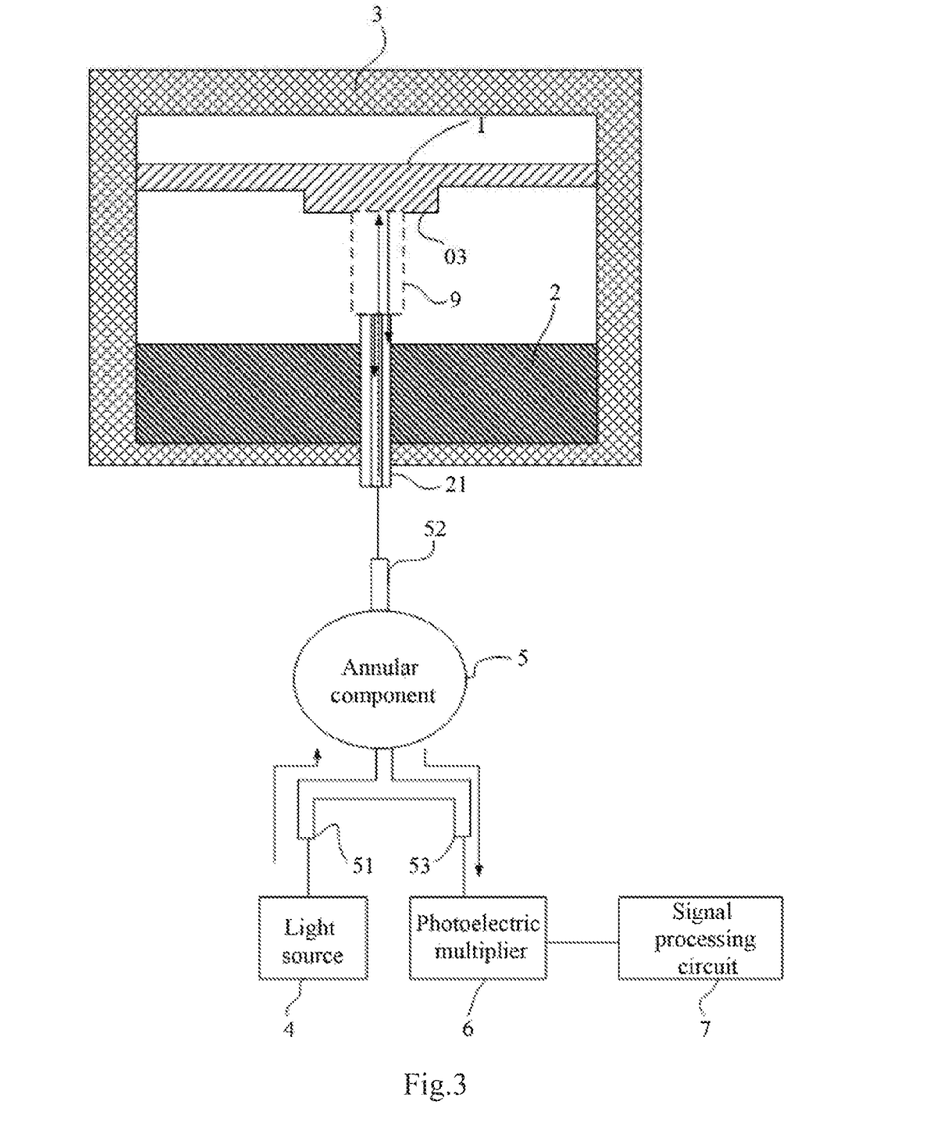
FIG. 3 is a schematic diagram of an equivalent mechanics model of the acceleration sensor according to the embodiment of this disclosure.

Optionally in the accelerometer according to an embodiment of this disclosure, as illustrated in FIG. 3, the accelerometer can further include a substrate 2 arranged opposite to and spaced from the acceleration sensor 1, an encapsulation structure 3 encapsulating the acceleration sensor 1 and the substrate 2, and a light source 4, an annular component 5, a photoelectric multiplier 6, and a signal processing circuit 7, all of which are located outside the encapsulation structure.

The base 2 includes a hollow bushing 21 running through an area facing the mass body 03 in the acceleration sensor 1, where there is a first uni-mode optic fiber arranged in the hollow bushing 21, and an Extrinsic Fabry-Perot Interferometric (EFPI) cavity 9 is formed between the end face of the first uni-mode optic fiber facing the mass body 03, and the surface of the mass body 03 facing the substrate 2.

The light source 4 is connected with a first port 51 of the annular component 5 through a second uni-mode optic fiber, and configured to provide the annular component 5 with light.

A second port 52 of the annular component 5 is connected with the first uni-mode optic fiber through a third uni-mode optic fiber, and configured to transmit the light, provided to the annular component 5 by the light source, to the mass body 03 through the first uni-mode optic fiber.

A third port 53 of the annular component 5 is connected with the photoelectric multiplier 6 through a fourth uni-mode optic fiber, and configured to provide the photoelectric multiplier 6 with reflected light received through the first uni-mode optic fiber.

The signal processing circuit 7 is connected with the photoelectric multiplier 6, and configured to calculate the acceleration from a signal output by the photoelectric multiplier 6.

Optionally in the accelerometer above according to an embodiment of this disclosure, the mass body 03 may vibration due to the acceleration, there is a normal displacement of the mass body 03 due to the vibration thereof, and there is a change to the length of the EFPI cavity, i.e., a change to a difference in light journey of interference light, due to the normal displacement of the mass body 03, so that there is a changing intensity signal of the interference light. A light path in the accelerometer is routed as pointed by the arrow in FIG. 3, where light exiting the light source 4 enters the annular component 5 at the first port 51 thereof, exits the second port 52 of the annular component 5, and then enters the EFPI cavity through the first uni-mode optic fiber, and both reflected on and transmitted through an exit end face of the first uni-mode optic fiber of the EFPI cavity, so that the transmitted light arriving at a lower surface of the mass body 03 through the EFPI cavity is reflected, and then returned to the first uni-mode optic fiber, and a part of the light is reflected directly at the interface between the first uni-mode optic fiber and the air. There is destructive or constructive interference of the two beams of reflected light dependent upon the difference in light journey thereof, and the interference light arrives at the photoelectric multiplier 6 through the fourth uni-mode optic fiber via the third port 53 of the annular component 5, so the signal processing circuit 7 can calculate the acceleration according to the signal output by the photoelectric multiplier 6.

Optionally in the accelerometer according to an embodiment of this disclosure, the annular component 5 can avoid the problem of interference crosstalk between light bidirectionally transmitted when another single element is used.

Optionally in the accelerometer according to an embodiment of this disclosure, the light source 4 is a light source of laser with a wavelength of 1550 nm. Of course, the light source 4 can alternatively be a light source of laser with a wavelength of 1310 nm. There is a larger measurement range of the accelerometer including the light source 4 with a longer wavelength.

Optionally when the wavelength of the light source 4 is 1550 nm, the first uni-mode optic fiber, the second uni-mode optic fiber, the third uni-mode optic fiber, and the fourth uni-mode optic fiber can be 9/125SI13-PI155 polyimide coating communication optic fibers with a core diameter of 9 μm, and a corresponding cutoff wavelength of 1550 nm.

Optionally in the accelerometer according to an embodiment of this disclosure, the first uni-mode optic fiber arranged in the hollow bushing 21 can be 9/125SI13-PI155 polyimide coating communication optic fibers, and of course, in order to raise the operating temperature to more than 500° C. the polyimide coating in the 9/125SI13-PI155 polyimide coating communication optic fiber of the first uni-mode optic fiber arranged in the hollow bushing 21 can be removed, that is, the first uni-mode optic fiber can be a coating-free uni-mode optic fiber.

Figure 4:
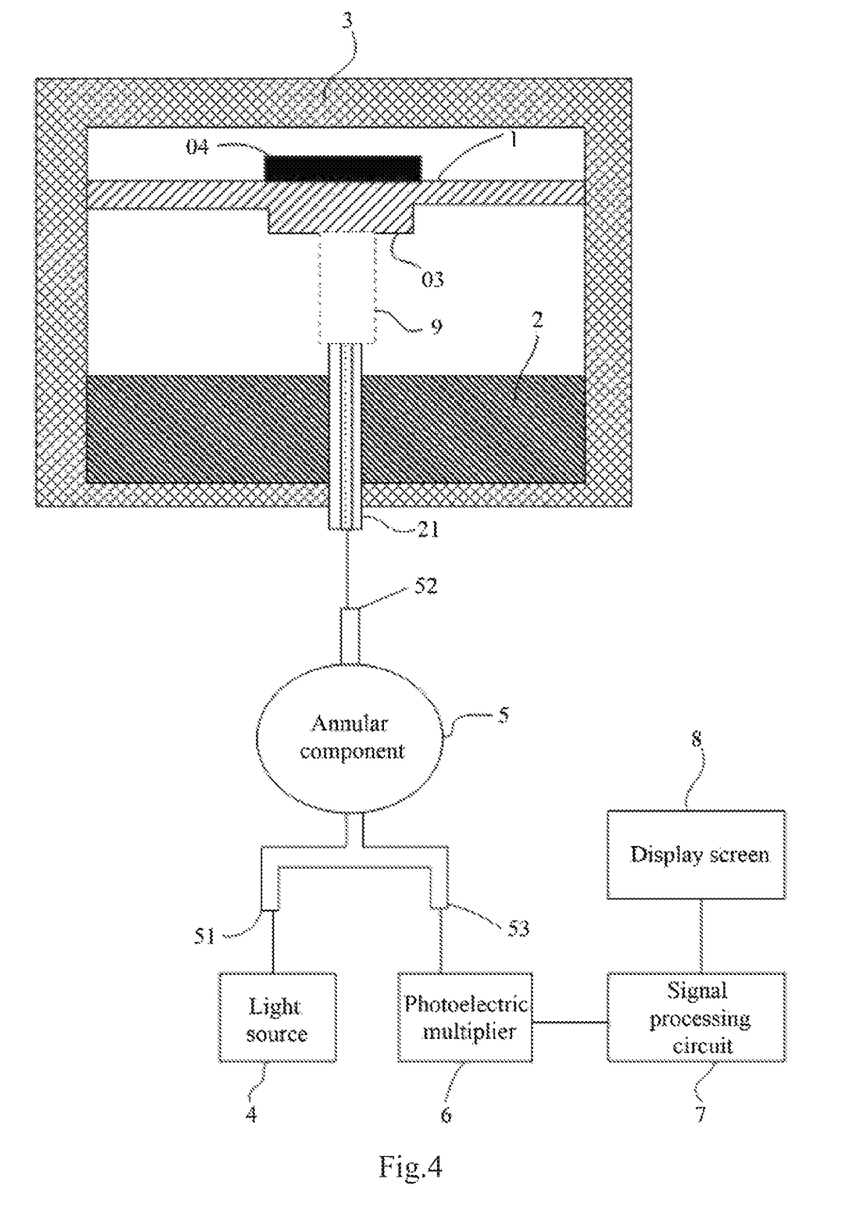
FIG. 4 is a second schematic structural diagram of an accelerometer according to an embodiment of this disclosure.

Optionally in the accelerometer according to an embodiment of this disclosure, in order to enable the light arriving at the upper surface of the mass body 3 through the EFPI cavity 9 to be transmitted, so as to avoid the light arriving at the upper surface of the mass body 9 through the EFPI cavity 9 from being reflected on the upper surface of the mass body 9, and returned to the first uni-mode optic fiber in the hollow bushing 21, which would otherwise interfere the dual beams of interference light in the first uni-mode optic fiber, a antireflection film 04 is further arranged on the side of the mass body 03 away from the substrate 2 as illustrated in FIG. 4.

Optionally in the accelerometer according to an embodiment of this disclosure, the material of the antireflection film 04 can be aluminum nitride (AlN) because the thermal expansion coefficient of AlN is closer to that of SiC, thus alleviating thermal mismatching.

Optionally the difference in phase δ between reflected light beams on front and back surfaces of the antireflection film 04 generally satisfies $$\delta = \frac{4\pi}{\lambda} ne + \frac{\pi}{2}. \tag{2.1}$$

Where e is the thickness of the antireflection film 04. As per the Fresnel equation, a reflection coefficient ρ1 of the front surface of the antireflection film 04, and a reflection coefficient ρ2 of the back surface of the antireflection film 04 respectively for normally incident light are $$\rho_1 = \frac{n_s - n_z}{n_s + n_z}; \tag{2.2}$$

$$\rho_2 = \frac{n_z - n_0}{n_z + n_0} = \frac{n_z - 1}{n_z + 1}. \tag{2.3}$$

As per the interference theory of a single layer of thin film, an amplitude reflection coefficient of the antireflection film 04 is $$\rho = \frac{\rho_1 + \rho_2 \exp(i\delta)}{1 + \rho_1 \rho_2 \exp(i\delta)}. \tag{2.4}$$

If the absorbency of the thin film is not considered, then a reflection ratio of the antireflection film 04 may be $$R = |\rho|^2 = \frac{\rho_1^2 + \rho_2^2 + 2\rho_1\rho_2\cos\delta}{1 + \rho_1^2 + \rho_2^2 + 2\rho_1\rho_2\cos\delta}. \tag{2.5}$$

Where $n_s$, $n_z$, and $n_0$ are refractive indexes of SiC, the antireflection film 04, and the medium of air respectively.

The known refractive indexes of SiC and the medium air are substituted into simultaneous Equations (2.1) to (2.5), which can be rearranged into the reflection ratio of the antireflection film 04 (normal incidence) as follows $$R = \frac{(n_s - 1)\cos^2\frac{\delta}{2} + \left(\frac{n_s}{n_s} - n_z\right)^2 \sin^2\frac{\delta}{2}}{(n_s + 1)\cos^2\frac{\delta}{2} + \left(\frac{n_s}{n_s} + n_z\right)^2 \sin^2\frac{\delta}{2}} \tag{2.6}$$

-continued
$$= \frac{1.55 n_z^2 \cos^2\frac{\delta}{2} + (2.55 - n_z^2)\sin^2\frac{\delta}{2}}{3.55 n_z^2 \cos^2\frac{\delta}{2} + (2.55 + n_z^2)\sin^2\frac{\delta}{2}}.$$

Given the refractive index $n_z$ of the antireflection film 04, the reflection ratio of the antireflection film 04 is a function of δ, i.e., a function of $n_z e$. The correlation between the reflection ratio of the antireflection film 04, and the refraction index and the thickness of the antireflection film 04 can be simulated using the MATLAP software to determine that the reflection ratio is minimum at $n_z e = \lambda/8$, $5\lambda/8$, and $9\lambda/8$.

Optionally in the accelerometer according to an embodiment of this disclosure, the reflection ratio of the antireflection film 04 is minimum when the thickness of the antireflection film 04 is $\lambda/8n_z$, $5\lambda/8n_z$, or $9\lambda/8n_z$, where λ is the wavelength of the light source 4, and $n_z$ is the refractive index of the antireflection film 04.

Optionally it is more difficult to fabricate the antireflection film 04 with a larger thickness at a higher cost from the perspective of a fabrication process thereof, so when the wavelength of the light source 4 is 1550 nm, and the material of the antireflection film 04 is aluminum nitride, the thickness of the antireflection film 04 is set to approximately 70 nm.

Optionally in order to guarantee the refractory characteristic of the substrate 2 and the encapsulation structure 3, in the accelerometer according to an embodiment of this disclosure, the material of the substrate 2 can be Pyrex glass, and the material of the encapsulation structure 3 can be alumina ceramic, although the embodiment of this disclosure will not be limited thereto.

Optionally in the accelerometer according to an embodiment of this disclosure, the signal processing circuit 7 includes an operational amplifier, an adjustable resistor, and a filter capacitor.

Optionally in the accelerometer according to an embodiment of this disclosure, as illustrated in FIG. 4, the accelerometer can further include a display screen 8, connected with the signal processing circuit 7, configured to display the acceleration calculated by the signal processing circuit 7.

Optionally in the accelerometer according to an embodiment of this disclosure, since there is more stable mechanical performance of the cantilever in the acceleration sensor, and the accelerometer operates with the EFPI technology and the SiC micro-machining technology, the operating temperature of the accelerometer can be improved, and also the accelerometer can be provided with high stability, measurement precision, environmental adaptability, and interference robustness. Accordingly there is a promising application prospect of the accelerometer with higher precision and sensitivity in on-vehicle motor turbo charging, gas turbine monitoring, aeronautic and astronautic automatic driving, rocket satellites, and other instances where there is a rigorous vibration parameter test environment.

When the antireflection film 04 is further arranged on the mass body 03 of the acceleration sensor in the accelerometer according to an embodiment of this disclosure, the acceleration sensor can be fabricated by firstly forming a pattern of the antireflection film 04 on a SiC wafer, and then forming patterns of the cantilever 02 and the mass body 03, optionally in the following steps.

(1) The SiC wafer is thinned into the base.

Optionally the thickness of the SiC wafer is generally approximately 340 μm, and in order to reduce the thickness of the SiC wafer, the wafer can be ground using a diamond to thin the wafer to the thickness of 80 μm, thus lowering the difficulty of a subsequent patterning process.

Figure 5A:
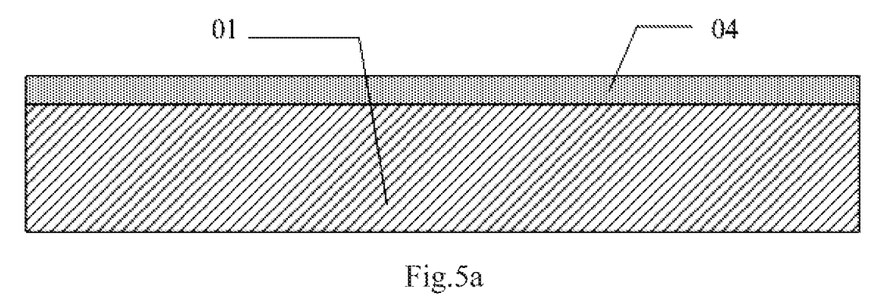
FIG. 5A to FIG. 5H are schematic structural diagrams after respective steps are performed to fabricate the acceleration sensor in the accelerometer according to the embodiment of this disclosure.

(2) The antireflection film 04 with a thickness of approximately 70 nm is formed on the base 01, where the material of the antireflection film 04 is AlN, as illustrated in FIG. 5A.

Figure 5B:
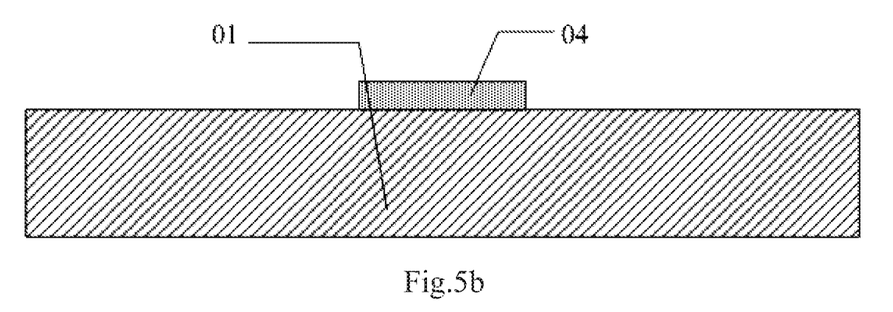

(3) The antireflection film 04 is patterned by reserving the antireflection film 04 in the area where the mass body 03 is to be formed, and removing the antireflection film 04 in the other area, as illustrated in FIG. 5B.

Figure 5C:
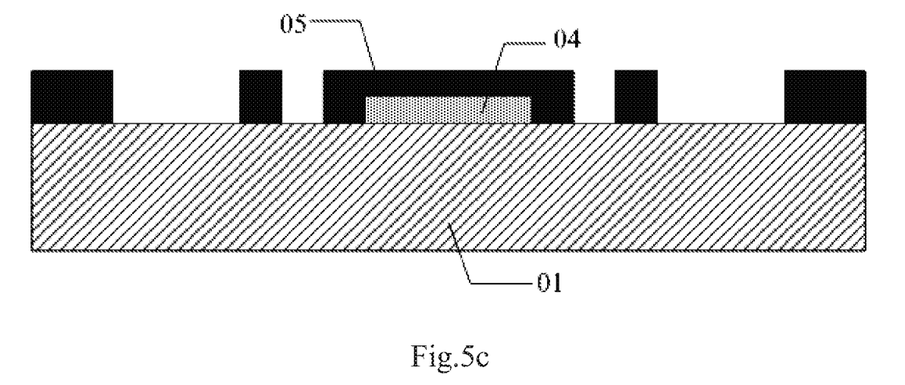

(4) Photoresist 05 is applied and patterned as illustrated in FIG. 5C.

Optionally the photoresist 05 is applied using a photoresist applier, exposed to UV rays, and then patterned.

Figure 5D:
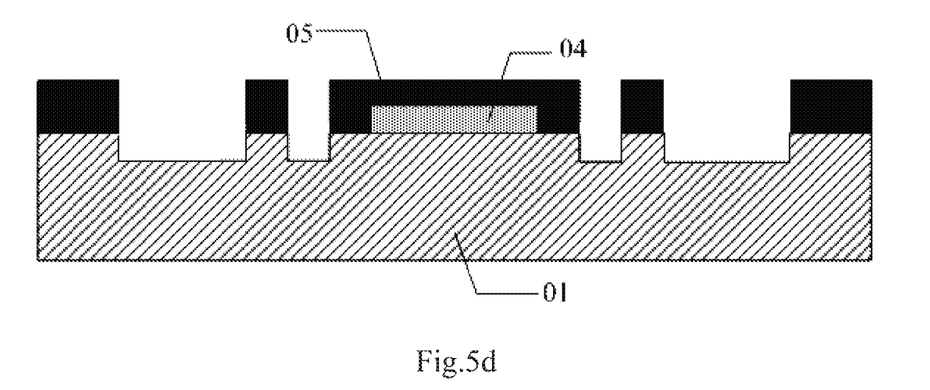

(5) The base 01 is etched through Inductively Coupling Plasma (ICP) dry etching using the patterned photoresist 05 as a mask, where there are reaction gases of $SF_6$ and $O_2$, and an etching depth of 12 μm, as illustrated in FIG. 5D.

Figure 5E:
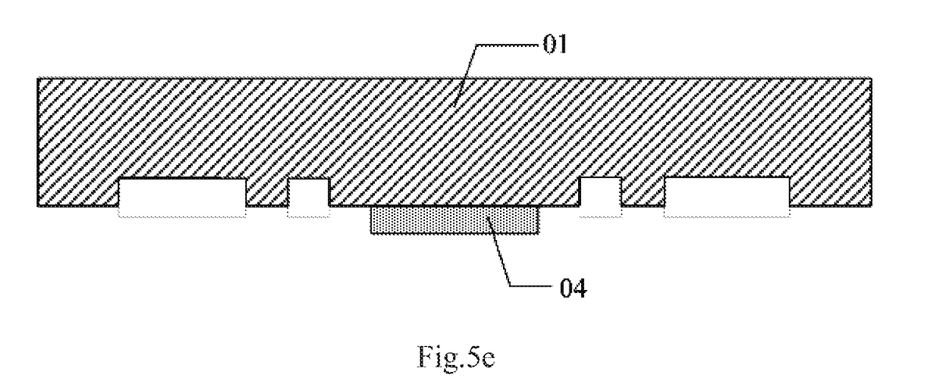

(6) The photoresist 05 is removed, and the base 01 is inverted, so that the backside thereof is etched, as illustrated in FIG. 5E.

Figure 5F:
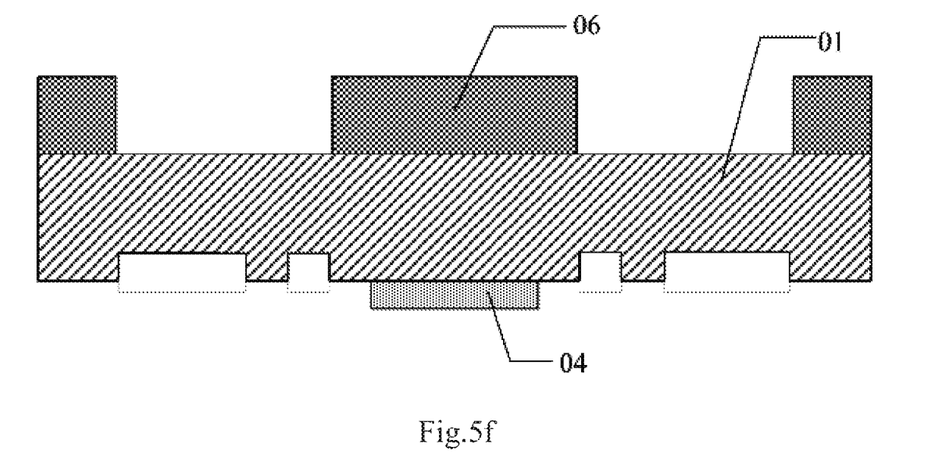

(7) A Ni mask 06 is electroplated and patterned as illustrated in FIG. 5F.

Figure 5G:
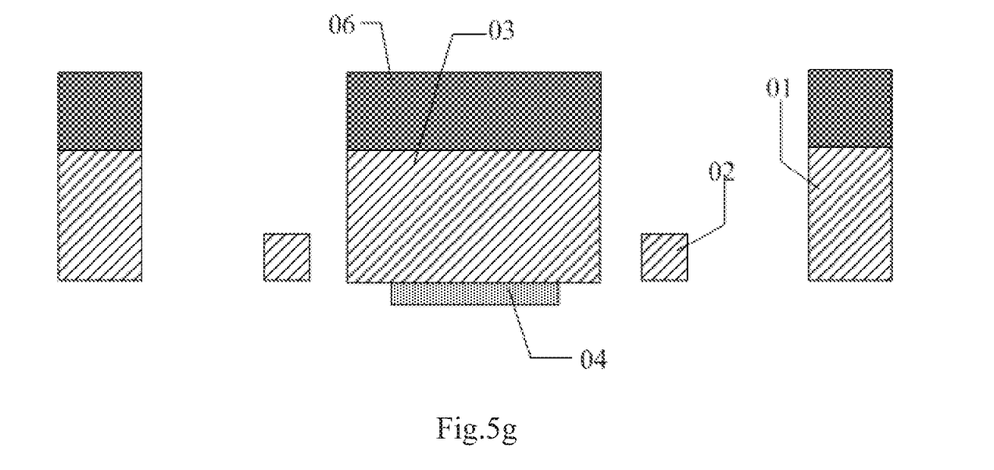

(8) The base 01 is etched through Inductively Coupling Plasma (ICP) dry etching, where there are reaction gases of $SF_6$ and $O_2$, and an etching depth of 68 μm, and a pattern of the integral structure of the cantilever 02, the mass body 03, and the base 01, as illustrated in FIG. 5G.

Figure 5H:
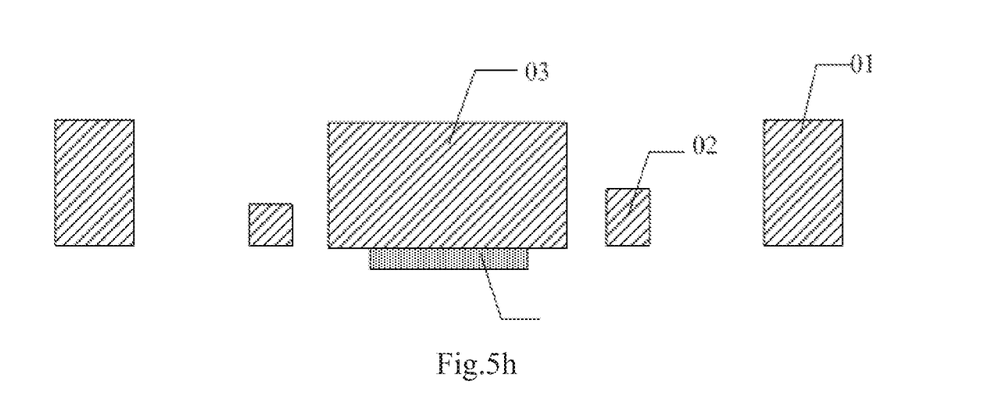
Figure 6:
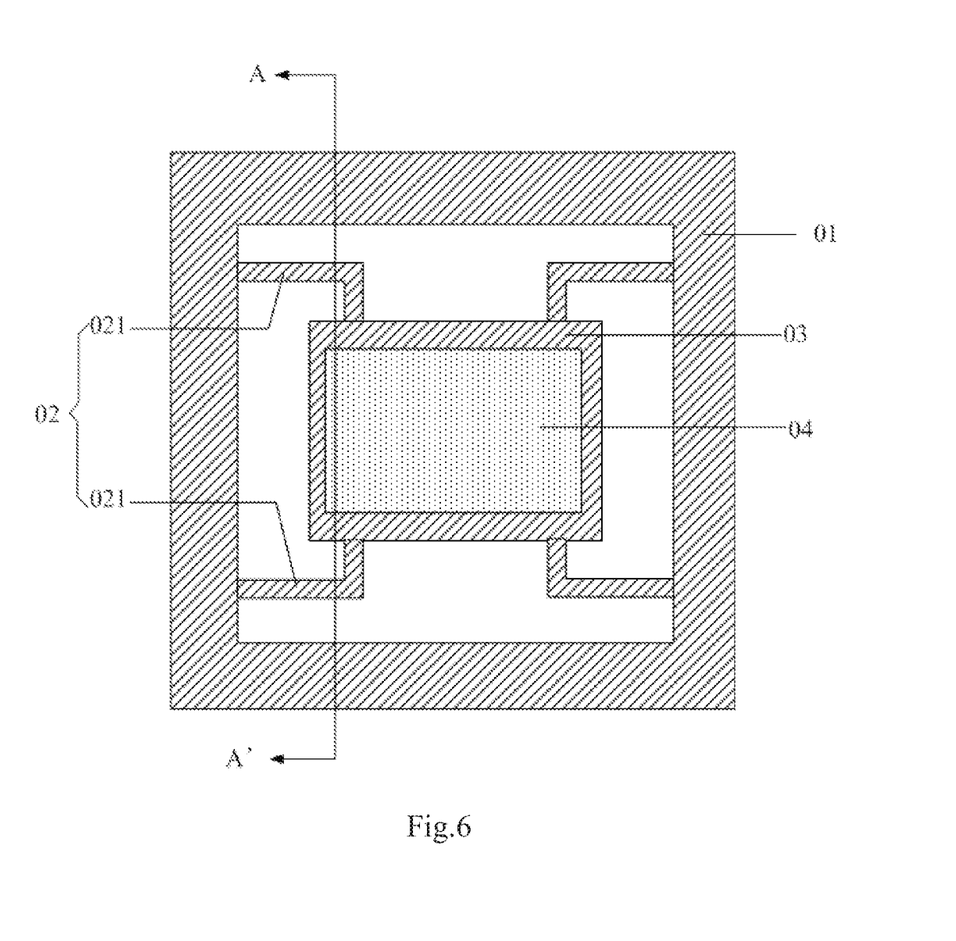
FIG. 6 is a schematic structural diagram of the acceleration sensor arranged with an antireflection film as illustrated in FIG. 5H in a top view.

(9) The Ni mask 06 is removed as illustrated in FIG. 5H, where FIG. 6 illustrates a top view corresponding to FIG. 5H, and FIG. 5H is a schematic sectional view of FIG. 6 along AA'.

(10) The structure is rinsed, and the pattern is checked.

In the acceleration sensor and the accelerometer above according to the embodiments of this disclosure, the acceleration sensor includes the base, the cantilever, and the mass body fixed on the base through the cantilever, where the shape of the mass body is a centrally symmetric shape; and the cantilever includes four L-shaped arms, where the respective L-shaped arms include long arms connected with the base, and short arms connected with the mass body, and any adjacent two of the L-shaped arms are arranged symmetric to an axis. Since the cantilever includes the four symmetrically arranged L-shaped arms holding each other transversally, there is high transversal interference robustness, the structure is simple, and there is low fabrication difficulty.

Evidently those skilled in the art can make various modifications and variations to this disclosure without departing from the spirit and scope of this disclosure. Thus this disclosure is also intended to encompass these modifications and variations thereto so long as the modifications and variations come into the scope of the claims appended to this disclosure and their equivalents.

The invention claimed is:

1. An accelerometer, comprising an acceleration sensor, the acceleration sensor comprising a base, a cantilever, and a mass body fixed on the base through the cantilever, wherein:
   a shape of the mass body is a centrally symmetric shape; and
   the cantilever comprises four L-shaped arms, wherein the respective L-shaped arms comprise a long arm connected with the base, and a short arm connected with the mass body, and any adjacent two of the L-shaped arms are arranged symmetric to an axis;
   wherein the accelerometer further comprises: a substrate arranged opposite to and spaced from the acceleration sensor, an encapsulation structure encapsulating the acceleration sensor and the substrate, and a light source, an annular component, a photoelectric multiplier, and a signal processing circuit, all of which are located outside the encapsulation structure, wherein:
   the base comprises a hollow bushing running through an area facing the mass body in the acceleration sensor, wherein there is a first uni-mode optic fiber arranged in the hollow bushing, and an Extrinsic Fabry-Perot Interferometric (EFPI) cavity is formed between an end face of the first uni-mode optic fiber facing the mass body and the surface of the mass body facing the substrate;
   the light source is connected with a first port of the annular component through a second uni-mode optic fiber, and configured to provide the annular component with light;
   a second port of the annular component is connected with the first uni-mode optic fiber through a third uni-mode optic fiber, and configured to transmit the light, provided to the annular component by the light source, to the mass body through the first uni-mode optic fiber;
   a third port of the annular component is connected with the photoelectric multiplier through a fourth uni-mode optic fiber, and configured to provide the photoelectric multiplier with reflected light received through the first uni-mode optic fiber; and
   the signal processing circuit is connected with the photoelectric multiplier, and configured to calculate the acceleration from a signal output by the photoelectric multiplier.

2. The accelerometer according to claim 1, wherein an antireflection film is further arranged on a side of the mass body away from the substrate.

3. The accelerometer according to claim 2, wherein a material of the antireflection film is aluminum nitride.

4. The accelerometer according to claim 3, wherein a thickness of the antireflection film is $\lambda/8n_z$, $5\lambda/8n_z$, or $9\lambda/8n_z$, wherein $\lambda$ is a wavelength of the light source, and $n_z$ is a refractive index of the antireflection film.

5. The accelerometer according to claim 1, wherein the light source is a light source of laser with a wavelength of 1550 nm.

6. The accelerometer according to claim 1, wherein a material of the substrate is Pyrex glass.

7. The accelerometer according to claim 1, wherein a material of the encapsulation structure is alumina ceramic.

8. The accelerometer according to claim 1, wherein the first uni-mode optic fiber is a coating-free uni-mode optic fiber.

9. The accelerometer according to claim 1, wherein the accelerometer further comprises a display screen, connected with the signal processing circuit, configured to display the acceleration calculated by the signal processing circuit.

10. The accelerometer according to claim 1, wherein the cantilever, the base, and the mass body are structured integrally.

11. The accelerometer according to claim 1, wherein the material of the cantilever, the base, and the mass body is a material of silicon carbide.

12. The accelerometer according to claim 11, wherein the material of silicon carbide is a monocrystalline material of 6H-SiC.

13. The accelerometer according to claim 1, wherein a shape of the mass body is a rectangle, connection points of the short arms of the L-shaped arms with the mass body are adjacent to four corners of the rectangle.

14. The accelerometer according to claim 13, wherein a length of the long arm of the respective L-shaped arms ranges from 1700 μm to 1900 μm, a length of the short arm thereof ranges from 450 μm to 550 μm, and a width of the long arm and the short arm ranges from 110 μm to 130 μm.

* * * * *